United States Patent [19]

Williams

[11] Patent Number: 5,452,860
[45] Date of Patent: Sep. 26, 1995

[54] MATERIAL REDUCING AND SHREDDING APPARATUS

[76] Inventor: Robert M. Williams, 16 La Hacienda, St. Louis, Mo. 63124

[21] Appl. No.: 257,946

[22] Filed: Jun. 10, 1994

Related U.S. Application Data

[63] Continuation of Ser. No. 5,788, Jan. 19, 1993, abandoned.

[51] Int. Cl.⁶ .................................................. B02C 18/40
[52] U.S. Cl. ...................... 241/78; 241/79.1; 241/152.2; 241/242; 241/DIG. 31
[58] Field of Search .............. 241/24, 29, 79.1, 241/88.4, 89.3, 158, 242, DIG. 31, 152.2, 78

[56] References Cited

U.S. PATENT DOCUMENTS

| | | | |
|---|---|---|---|
| Re. 17,334 | 6/1929 | Liggett | 241/88.4 X |
| Re. 28,693 | 1/1976 | Doi et al. | 346/74 ES |
| 2,767,929 | 10/1956 | West | 241/189 |
| 2,973,909 | 3/1961 | Danyluke | 241/186 |
| 3,489,354 | 1/1970 | Harper et al. | 241/99 X |
| 3,662,395 | 5/1972 | Doi et al. | 346/74 ES |
| 3,687,062 | 8/1972 | Frank | 241/79.1 X |
| 3,744,729 | 7/1973 | Ackerman | 241/242 X |
| 3,857,519 | 12/1974 | Schafer et al. | 241/237 |
| 3,923,256 | 12/1975 | Dorner | 241/DIG. 31 X |
| 4,002,302 | 1/1977 | Miller | 241/89 |
| 4,025,990 | 5/1977 | Lovette, Jr. | 241/DIG. 31 X |
| 4,230,282 | 10/1980 | Haase | 241/159 |
| 4,240,587 | 12/1980 | Letsch | 241/DIG. 31 X |
| 4,355,556 | 10/1982 | Ulsky | 83/124 |
| 4,394,983 | 7/1983 | Ulsky | 241/243 |
| 4,422,581 | 12/1983 | Chryst | 241/DIG. 31 X |
| 4,533,053 | 8/1985 | Kenny et al. | 209/636 |
| 4,726,530 | 2/1988 | Muller et al. | 241/DIG. 31 X |
| 4,815,667 | 3/1989 | Keller | 241/79.1 X |
| 4,896,836 | 1/1990 | Mitchell | 241/81 |
| 4,921,597 | 5/1990 | Lurie | 209/223.2 |
| 5,052,630 | 10/1991 | Hinsey et al. | 241/36 |

FOREIGN PATENT DOCUMENTS

| | | | |
|---|---|---|---|
| 515321 | 11/1992 | European Pat. Off. | 241/79.1 |
| 11184 | 1/1979 | Japan | 241/DIG. 31 |
| 249313 | 3/1926 | United Kingdom | 241/79.1 |

*Primary Examiner*—Frances Han
*Attorney, Agent, or Firm*—Polster, Lieder, Woodruff & Lucchesi

[57] ABSTRACT

An apparatus for reducing and separating a mixed makeup of material in which a principal mill for grinding, ripping and tearing the subject material is provided with a magnetic separator for extracting the magnetic fractions from the non-magnetic fractions and separately discharging the magnetic fractions which are separately collected from the non-magnetic material. The apparatus may employ a preliminary material reducing unit to reduce the material to a suitable size for processing in the principal mill, as this feature is useful to reduce such bulky material as vehicle tires which are the usual source of magnetic material that needs to be separated out.

4 Claims, 3 Drawing Sheets

MATERIAL REDUCING AND SHREDDING APPARATUS

This is a continuation of copending application Ser. No. 08/005,788 filed on Jan. 19, 1993 now abandoned.

BACKGROUND OF THE INVENTION

1. Field of the Invention

The invention is directed to apparatus for reducing material so as to facilitate the separation of different classes of material, and especially the metallic and non-metallic material in vehicle tires and the like.

2. Description of the Prior Art

The disposal of vehicle tires is especially troublesome because such items are objectionable in landfills, and destruction by burning is no longer permitted. Apparatus is known for grinding tires to reduce the bulk without regard to the metallic wires embedded in the rubber. It is known that rock and coal crushers will not process vehicle tires as the hammer mill of this type of apparatus is not suitable to process vehicle tires for separating the metallic from the rubber material. Prior art falling into this class of unsuitable apparatus is illustrated in West 2,767,929 of Oct. 29, 1956, Danyluk 2,973,909 of Mar. 7, 1961, Schafer et. al. 3,857,519 of Dec. 31, 1974, Miller 4,002,302 of Jan. 11, 1977, and Hinsey et. al. 5,052,630 of Oct. 1, 1991.

Apparatus that is addressed to the reduction of vehicle tire carcass and refuse shredding is Ulsky 4,394,983 of Jul. 26, 1983 and Ulsky 4,355,556 of Oct. 26, 1982, the latter patent being constructed to remove a tire reinforcing rim from the body of the carcass. These patents recognize that shredding and grinding vehicle tires is a most difficult operation for common refuse shredders.

In a broad sense, the present invention is directed to providing a unique combination of features in apparatus that respond to the problem of disposing of vehicle tires by an initial reduction of the size of the tire carcass followed by separating the rubber components and magnetic type content of the tires from the remainder of the carcass so that the magnetics become a by-product of the reduction process.

A broad object of the apparatus is to process vehicle tire carcasses by reducing the size thereof and then subjecting the tire to an initial stripping of the rubber from the metallic wire to better expose that wire by pulling the rubber from the wire.

Another object is to provide a cage at the outlet from apparatus that grinds the carcass material to determine the particle size of the rubber with a minimum of wire remainder.

Still another object is to operate apparatus that is unique in its capability of pulling magnetic wire reinforcement from the rubber body material while not deliberately cutting the wire strands so that such wire that accumulates in the grinding chamber is prevented from jamming the apparatus by being magnetically removed by a selectively rotary means exerting a magnetic withdrawal force.

Other objects of the invention will be set forth in the following description.

BRIEF DESCRIPTION OF THE DRAWING

Certain preferred forms of the invention are shown in the views which are.

DETAILED DESCRIPTION OF THE EMBODIMENT

Figure 1:
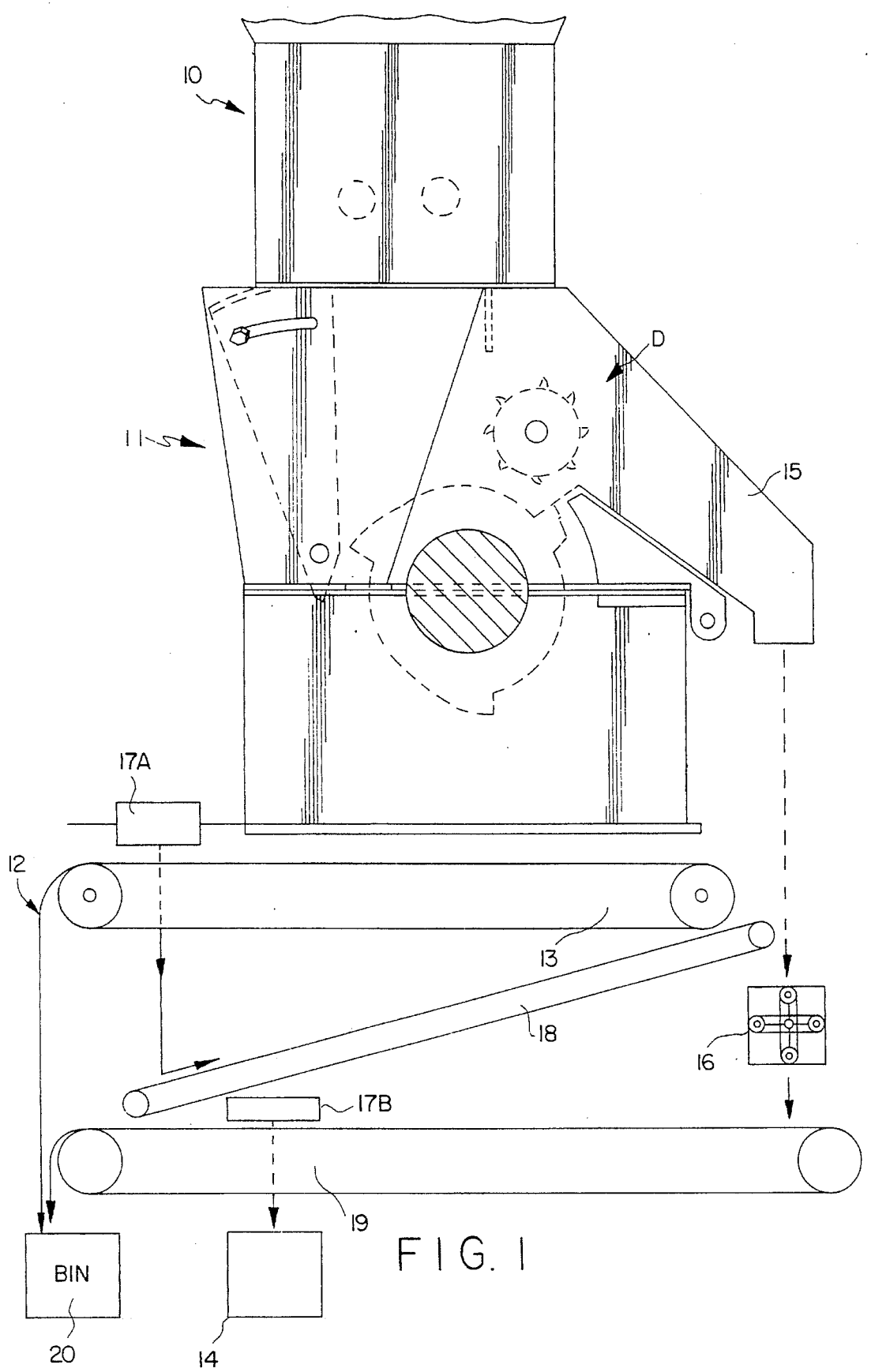
FIG. 1 is a schematic diagram of a flow system associated with apparatus for segregating magnetic and nonmagnetic materials.

Referring now to the several views of the drawings, there is shown in FIG. 1 a first mode the apparatus may take in which the essential components of the invention include a material receiving and reducing unit 10, a principal apparatus 11 for refining the material to extract magnetic content, and a flow system 12 associated with the apparatus 11.

Turning in more detail to FIG. 1, there is depicted a diagramatic material flow system which involves a material feeder 10 which is operative to prepare incoming material by effecting a preliminary reduction. That feeder 10 directs its output into a mill 11 wherein the material is reduced and separated according to whether it is essentially non-metallic in character or essentially magnetic. From the mill 11 the material is discharged to takeaway means 12 which comprises a belt conveyor 13 for moving the essentially non-magnetic material to a collection bin 14.

In the flow system of FIG. 1, the mill 11 discharges from its bottom onto the belt conveyor the fractions of rubber and non-magnetic material, except that same magnetic material may still cling to the rubber. As seen the mill is provided with a separate discharge chute 15 for essentially magnetic material that may have rubber clinging to it. The discharge from chute 15 enters a ring grinder 16 and discharges onto a belt conveyor 19 which moves the product under a magnetic unit 17B where the magnetic fraction is separated and fed to a bin 20. Since the main discharge of rubber fraction is received on the belt conveyor 13, such fraction is passed under a magnetic unit 17A which is directed onto a belt conveyor 18 which moves that fraction for delivery to the ring grinder 16 where further reduction of rubber and magnetic fraction takes place. The final separation of the rubber fractions is collected in bin 20, while the magnetic fraction is collected in a bin 14.

Figure 2:
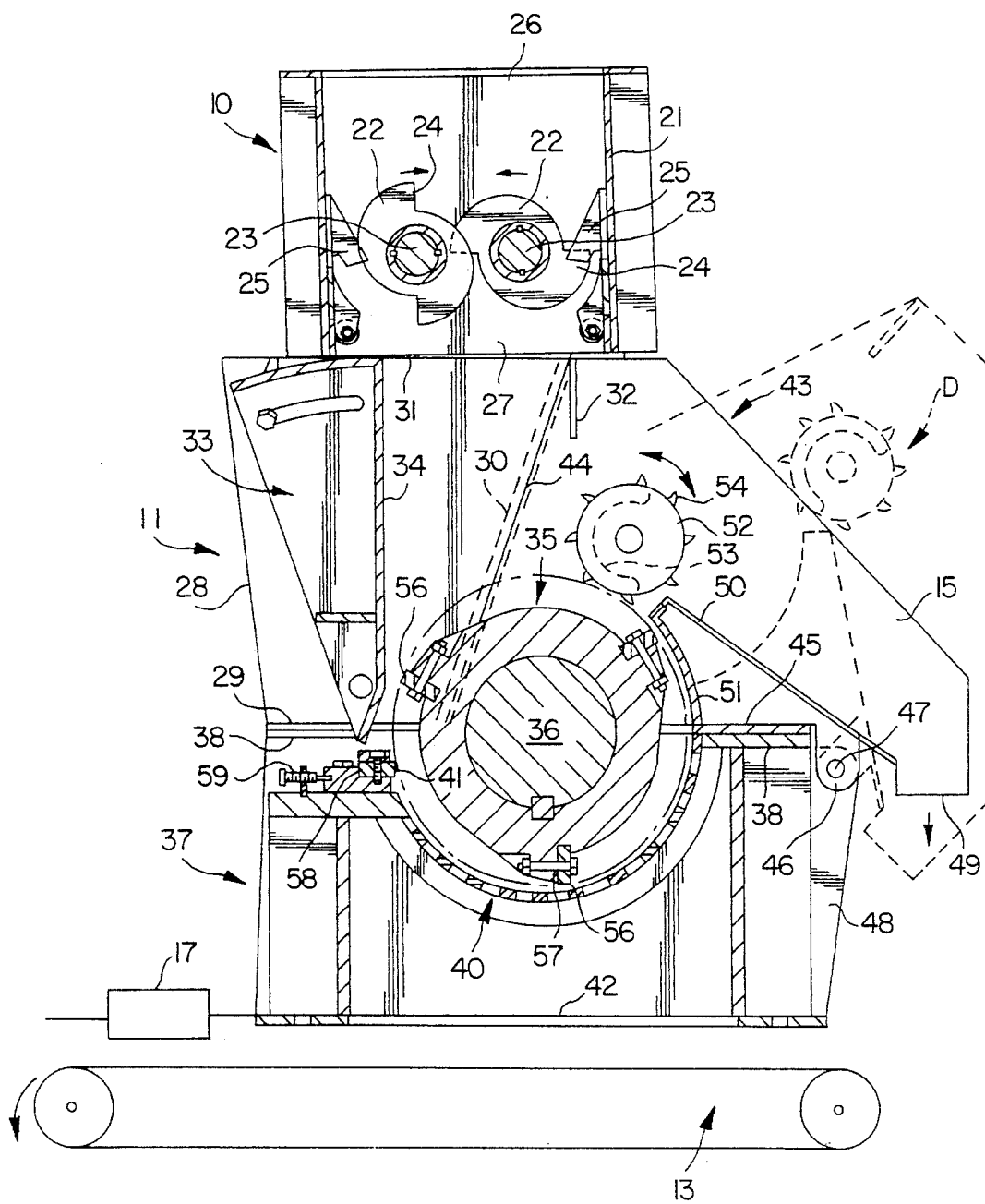
FIG. 2 is a vertical sectional view of the apparatus having a primary rotor for initiating the separation of the material such as vehicle tires, and motor operated magnetic material separating apparatus.

The view of FIG. 2 reveals the structural details and operation of the apparatus seen diagramatically in FIG. 1. Thus the reduction unit 10 includes a suitable housing 21 for enclosing a pair of shafts driving material size reducing rotary cutters 22 so that the cutting elements 24 on the cutters 22 cooperated with fixed elements 25 mounted in the housing 21, as shown. The housing 21 has an inlet opening 26 and an outlet 27 so that material, such as vehicle tires and assorted other material, will pass through the counter rotating cutters 22 to fall directly through the outlet 27.

The mill 11 has a suitable frame 28 which supports the housing 21 of unit 10 in position to receive the material from the outlet 27 of unit 10. The frame 28 is provided with a base plate 29 for the portion of the frame 28 which has a slanted parting edge 30 which extends angularly upwardly from the plate 29 and terminates at an opening 31 which aligns with the outlet 27 of unit 10. The opening 31 is formed between a fixed divider wall 32 and an adjustable guide 33 which presents a wall 34 that can be spaced from the fixed divider wall 32 to a proper position for guiding the material falling from unit 10 into the rotor 35 driven in a counter-clockwise direction on shaft 36. While not shown but which is easily understood the shaft 36 is carried in end bearings mounted in a mill base frame 37 having a horizontal base plate 38 to receive the plate 29 for the frame 21. Furthermore, the base frame 38 carries a grate structure 40 and an adjustable breaker blade 58 located at the leading edge of the grate 40. The material which passes through the grate 40 falls out of the base frame 37 at 42 and is collected on the moving conveyor 13.

The mill 11 is unique in that the construction thereof includes a movable enclosure 43 which has a wall 44 in abutment with the parting edge 30 of frame 28. The enclosure 43 has a plate 45 that rests on the plate 38 of the base frame 37. Adjacent to the plate 45 is a depending hinge 46 engaged on a pin 47 supported in a structural support 48 which is part of the base frame 37. The enclosure 43 is capable of being pivoted about hinge pin 47 to open the mill 11 and base frame 37 for access to the rotor 35. The extent of opening movement of the enclosure 43 is partially indicated in broken outline.

The enclosure 43 is unique in that it is formed with the chute 15 having an outlet end 49 for discharging magnetic material. A wall portion 50 of the chute is connected to a guide wall 51 that forms a continuation of the curved shape of the grate 40. In the area of the enclosure 43 adjacent the top of the walls 50 and 51 where they come together, the drum magnet D is seen to include a rotary member 52 disposed in the path of the material thrown upwardly by the rotor 35, as well as material moved laterally out of the path of the incoming material. That rotor member 52 is provided with a stationary magnet 53 positioned inside the shell body of the rotor 52, while the exterior surface of the body shell carries a series of projections 54 to grab the magnetic material and carry it clockwise into the upper end of the chute 48. Efficiency is obtained when the shell body of the magnetic extractor is rotated relative to the stationary magnet 53 in either of selected directions (clockwise or counterclockwise) to direct the magnetic fraction into the chute 15.

The detail of construction seen in FIG. 2 may be modified so that the drive motor (not seen) for the rotary member 52 may be reversed as chosen at certain times when the preliminary reduction of material from the unit 10 may have magnetic material still clinging to the non-metallic material. By attracting such partially reduced material, the member 52 will be able to pass the attracted material into the path of the teeth on the mill rotor 35 where the non-metallic material can be disconnected from the magnetic material while the rotary shell 52 is moving counterclockwise. The various means 12, 13, 14, 16, 17A, 17B, 18, 19 and 20 seen in FIG. 1 apply equally well to the apparatus in FIG. 2 and are not repeated.

Figure 3:
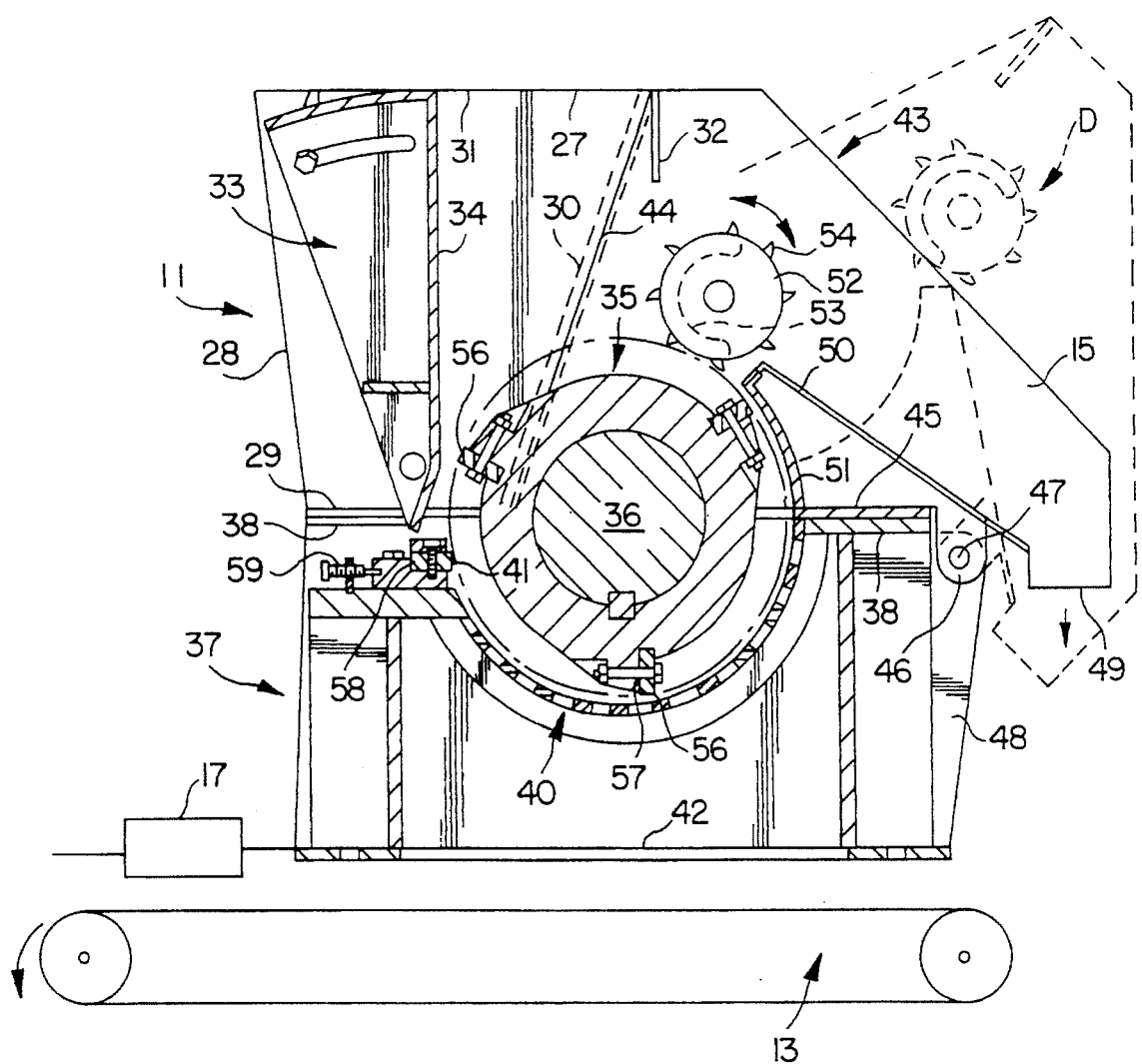
FIG. 3 is a modified vertical sectional view of a further embodiment of apparatus.

FIG. 3 depicts another feature of the invention. For example, it is often found convenient to omit the primary reduction unit 10 and feed the material without prior reduction directly through the inlet 31, thereby depending on the adjustable wall 34 and the stationary wall 32 to accommodate the feed material finding a position which will allow it to be drawn into the rotor 35, aided by the presence of the rotor 52 below the wall 32.

Figure 4:
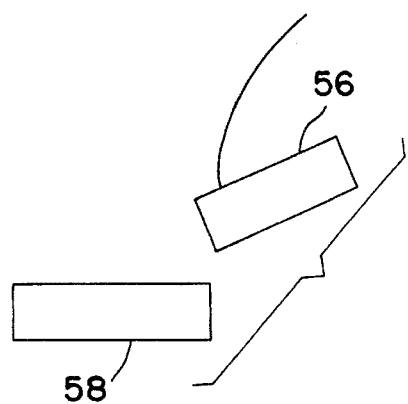
FIG. 4 is a fragmentary detail of means for ripping metallic content from the non-metallic content.

In the views of FIGS. 2 and 3, the rotor 35 carries teeth elements 56 secured on its periphery against a backing projection 57. Three such elements 56 are generally sufficient to constitute a desired working relation with the grate 40 to effect the reduction of material to a size capable of passing through the grate. Furthermore, the mill base 37 carries an adjustable element 59 so the breaker blade 58 can be adjusted to the path of motion of the teeth elements 56 to cause a ripping and tearing action as the rotor 35 forces the material to pass over the blade 58 and in the gap which may be of the order of 10 to 30 thousands of an inch relative to the elements 56 (see FIG. 4). This adjustment of blade 58 is desired to optimize the stripping of the wire from the rubber.

The foregoing disclosure embodies apparatus which broadly includes a first means 10 for beginning the reduction of material of the magnetic and non-magnetic character to be reduced so as to facilitate the classification of the magnetic and non-magnetic materials. The means 10 discharges directly into a mill 11 where the initially reduced material is subjected to the action of a rotor 35 which cooperates with the adjustable stationary member 41 to effect a stripping action to pull the magnetic material from the non-magnetic material and simultaneously reduce the non-magnetic material to a predetermined particle size while the magnetic material is substantially extracted from the non-magnetic material. A feature of the apparatus is that the magnetic material is extracted from the mill so as to prevent jamming the mill and to discharge the extracted magnetic material so that it does not again re-enter the non-magnetic material.

In order to provide commercial apparatus the magnetic material needs to be isolated as a by-product from the reduced non-magnetic material so that the two different materials can be processed separately.

What is claimed is:

1. Apparatus for separating out magnetic components embedded in non-magnetic material comprising:
   a) a mill housing having an inlet for the material having embedded magnetic components to be separated from non-magnetic material;
   b) perforated grate means forming an outlet for non-magnetic material of a size to pass through said grate perforations;
   c) rotary means in said mill housing having teeth thereon moving in an orbit for throwing the material having the embedded magnetic components over said grate means;
   d) blade means carried in said mill housing adjacent to the orbit of said teeth on said rotary means to effect separation of said magnetic components from non-magnetic material, said blade means and rotary teeth ripping the magnetic components in the non-magnetic material;
   e) magnetic means in said housing positioned in the path of the material thrown in said mill housing by said rotary means over said grate means, said magnetic means extracting magnetic components ripped from the thrown material; and
   f) outlet means in said housing to receive magnetic components separated from non-magnetic material.

2. The apparatus set forth in claim 1 wherein conveyor means is positioned adjacent said mill housing to receive non-magnetic material passing said grate means separately from magnetic components ripped from said non-magnetic material.

3. The apparatus set forth in claim 1 wherein said mill housing inlet is formed between an adjustable wall extending to a position adjacent said rotary means to guide the material into the orbit of said teeth on said rotary means and other wall means extendig toward said magentic means for guiding magnetic components thrown in said mill housing back to said magnetic means.

4. The apparatus set forth in claim 1 wherein material reduction means is connected to said mill housing inlet in position to direct the material to be separated into said mill housing, said material reduction means includes material size reducing rotary cutters.

* * * * *